US008832120B2

(12) United States Patent
Jones

(10) Patent No.: US 8,832,120 B2
(45) Date of Patent: Sep. 9, 2014

(54) METHODS AND SYSTEMS FOR ANALYZING WEIRDNESS OF VARIABLES

(75) Inventor: William C. Jones, O'Fallon, IL (US)

(73) Assignee: MasterCard International Incorporated, Purchase, NY (US)

( * ) Notice: Subject to any disclaimer, the term of this patent is extended or adjusted under 35 U.S.C. 154(b) by 80 days.

(21) Appl. No.: 13/361,530

(22) Filed: Jan. 30, 2012

(65) Prior Publication Data

US 2013/0198206 A1 Aug. 1, 2013

(51) Int. Cl.
    *G06F 17/30*     (2006.01)
    *G06Q 40/00*     (2012.01)
    *G06Q 20/40*     (2012.01)

(52) U.S. Cl.
    CPC ........ *G06F 17/3053* (2013.01); *G06Q 20/4016* (2013.01)
    USPC ............................................ 707/749; 705/38

(58) Field of Classification Search
    CPC ..... G06Q 40/00; G06Q 10/06; G06Q 10/063; G06Q 10/0637; G06Q 40/02; G06Q 40/4016
    USPC ......... 705/1.1, 7.11, 7.36, 7.37, 14.17, 14.46, 705/35, 348, 7.28, 38; 707/749
    See application file for complete search history.

(56) References Cited

U.S. PATENT DOCUMENTS

| | | | |
|---|---|---|---|
| 7,729,964 B2 | 6/2010 | Senturk et al. | |
| 7,758,503 B2 | 7/2010 | Lynn et al. | |
| 7,818,224 B2 | 10/2010 | Boerner | |
| 7,860,222 B1 | 12/2010 | Sidler et al. | |
| 7,882,021 B2 | 2/2011 | Baumgartner et al. | |
| 7,953,677 B2 | 5/2011 | Baum-Waidner et al. | |
| 2003/0097320 A1 | 5/2003 | Gordon | |
| 2006/0059063 A1* | 3/2006 | LaComb et al. | 705/35 |
| 2006/0080281 A1* | 4/2006 | Bongiorno et al. | 707/1 |
| 2007/0028219 A1 | 2/2007 | Miller et al. | |
| 2007/0136124 A1 | 6/2007 | Patterson, II et al. | |
| 2011/0071964 A1 | 3/2011 | Horvitz | |
| 2011/0238855 A1 | 9/2011 | Korsunsky et al. | |

OTHER PUBLICATIONS

International Search Report and Written Opinion, PCT/US2013023448 filed Jan. 28, 2013, 12 pages.

* cited by examiner

*Primary Examiner* — Jorge A Casanova
(74) *Attorney, Agent, or Firm* — Armstrong Teasdale LLP

(57) ABSTRACT

A computer-based method of determining a weirdness score for variables within a data set is provided. The method includes receiving a selection of a first variable, wherein the first variable is defined by a measure, a time period, and a plurality of entities, calculating a plurality of parameters for the first variable, wherein each of the plurality of parameters is calculated based at least in part on a deviation of a measured value from a predicted value, calculating a rank for each of the plurality of parameters for the first variable, wherein the rank of each parameter is calculated relative to corresponding parameters calculated for all other variables in the data set having the same measure and time period as the first variable, and calculating a weirdness score for the first variable based at least in part on the calculated rank of each of the plurality of parameters.

28 Claims, 7 Drawing Sheets

| RANK | ISSUER | ISSUER ID | DATE | PRODUCT CODE | ISSUING COUNTRY | METRIC | NARRATIVE |
|---|---|---|---|---|---|---|---|
| 1 | BANK A | 6293 | 28-JUL | PRODUCT A | USA | CLEARED CASH COUNT | SHARP RISE IN DAILY CLEARED CASH ACCOUNT |
| 2 | BANK B | 7114 | 24-FEB | PRODUCT B | RUS | DECLINE COUNT | ONE DAY SPIKE IN DAILY DECLINES |
| 3 | BANCO C | 782 | 29-SEP | PRODUCT C | USA | CLEARED CASH COUNT | AFTER NO VOLUME, CLEARED CASH COUNT RESUMED AT HIGH RATE |
| 4 | BANK D | 621 | 29-SEP | PRODUCT A | USA | APPROVAL COUNT | SHARP RISE IN APPROVAL COUNT |
| 5 | BANCO C | 782 | 29-SEP | PRODUCT C | USA | CLEARED CASH AMOUNT | AFTER NO VOLUME, CLEARED CASH AMOUNT RESUMED AT HIGH RATE |
| 6 | BANK A | 6293 | 28-JUL | PRODUCT A | USA | APPROVAL COUNT | SHARP RISE IN DAILY APPROVAL COUNT |
| 7 | CREDIT UNION E | 5416 | 18-SEP | PRODUCT A | USA | DECLINE COUNT | ONE DAY SPIKE IN DAILY DECLINES |
| 8 | F & COMPANY | 77 | 25-SEP | PRODUCT E | USA | CLEARED CASH COUNT | SHARP RISE IN DAILY CLEARED CASH COUNT |
| 9 | GBANK N.A. | 27 | 28-SEP | PRODUCT F | USA | CLEARED CASH COUNT | SHARP RISE IN DAILY CLEARED CASH COUNT |
| 10 | <UNDETERMINED> | 99999 | 31-MAY | PRODUCT B | DEU | APPROVAL AMOUNT | ONE DAY SPIKE IN DAILY APPROVAL AMOUNT |

METHODS AND SYSTEMS FOR ANALYZING WEIRDNESS OF VARIABLES

BACKGROUND OF THE INVENTION

The field of the present disclosure relates generally to analyzing data, and more particularly, to a network-based method and system for analyzing weirdness of a plurality of variables, including ranking disparate data by how unexpected each datum is based on how each datum compares to calculated predictions over time.

Many entities in a variety of industries store large volumes of data. Such data may include, for example, financial transaction data. The data may be analyzed, or mined, to identify trends, anomalies, and/or patterns in the data. By identifying trends, anomalies, and/or patterns in the data, potential issues and/or problems can be identified and addressed.

At least some known data analysis systems utilize complex modeling algorithms to analyze data. These known systems require significant computational resources and/or experienced programmers to implement. In general, with respect to these known systems, the more complex the analysis process, the longer it takes to generate results.

At least some of these known data analysis systems only compare identical types of data, and do not compare different types of data against one another. For example, if one particular data parameter increases significantly, when viewed in isolation, it may be determined that the particular data parameter is an outlier and/or an anomaly. However, in actuality, other data parameters may have similarly increased as part of an overall pattern or trend, and thus, this believed outlier is not actually an outlier.

Accordingly, it would be desirable to provide a computer system configured to analyze complex data without requiring significant computational resources, and determine how unexpected data is by comparing the data to calculated predictions over time.

BRIEF DESCRIPTION OF THE INVENTION

In one aspect, a computer-based method of determining a weirdness score for variables within a data set is provided. The method is performed using a computer coupled to a database. The method includes receiving a selection of a first variable included within the data set, wherein the first variable is defined by a measure, a time period, and a plurality of entities, calculating a plurality of parameters for the first variable, wherein each of the plurality of parameters is calculated based at least in part on a deviation of a measured value of the first variable from a predicted value of the first variable, calculating a rank for each of the plurality of parameters for the first variable, wherein the rank of each parameter is calculated relative to corresponding parameters calculated for all other variables in the data set having the same measure and time period as the first variable, and calculating a weirdness score for the first variable based at least in part on the calculated rank of each of the plurality of parameters for the first variable.

In another aspect, a computer system for determining a weirdness score for variables within a data set is provided. The computer system includes a memory device for storing data, and a computing device including a processor, the computing device coupled to the memory device. The computing device is configured to receive a selection of a first variable included within the data set, wherein the first variable is defined by a measure, a time period, and a plurality of entities, calculate a plurality of parameters for the first variable, wherein each of the plurality of parameters is calculated based at least in part on a deviation of a measured value of the first variable from a predicted value of the first variable, calculate a rank for each of the plurality of parameters for the first variable, wherein the rank of each parameter is calculated relative to corresponding parameters calculated for all other variables in the data set having the same measure and time period as the first variable, and calculate a weirdness score for the first variable based at least in part on the calculated rank of each of the plurality of parameters for the first variable.

In another aspect, a computer program embodied on a non-transitory computer readable medium for determining a weirdness score for variables within a data set is provided. The program includes at least one code segment executable by a computer to instruct the computer to receive a selection of a first variable included within the data set, wherein the first variable is defined by a measure, a time period, and a plurality of entities, calculate a plurality of parameters for the first variable, wherein each of the plurality of parameters is calculated based at least in part on a deviation of a measured value of the first variable from a predicted value of the first variable, calculate a rank for each of the plurality of parameters for the first variable, wherein the rank of each parameter is calculated relative to corresponding parameters calculated for all other variables in the data set having the same measure and time period as the first variable, and calculate a weirdness score for the first variable based at least in part on the calculated rank of each of the plurality of parameters for the first variable.

In another aspect a network-based system for determining a weirdness score for variables within a data set is provided. The system includes a client computer system, a database, and a server system coupled to the client computer system and the database. The server system is configured to receive from the client computer system a selection of a first variable included within the data set, wherein the first variable is defined by a measure, a time period, and a plurality of entities, calculate a plurality of parameters for the first variable, wherein each of the plurality of parameters is calculated based at least in part on a deviation of a measured value of the first variable from a predicted value of the first variable, calculate a rank for each of the plurality of parameters for the first variable, wherein the rank of each parameter is calculated relative to corresponding parameters calculated for all other variables in the data set having the same measure and time period as the first variable, and calculate a weirdness score for the first variable based at least in part on the calculated rank of each of the plurality of parameters for the first variable.

BRIEF DESCRIPTION OF THE DRAWINGS

FIG. 7 is an exemplary screenshot of a list of top ten weirdest variables.

DETAILED DESCRIPTION OF THE INVENTION

Figure 1:
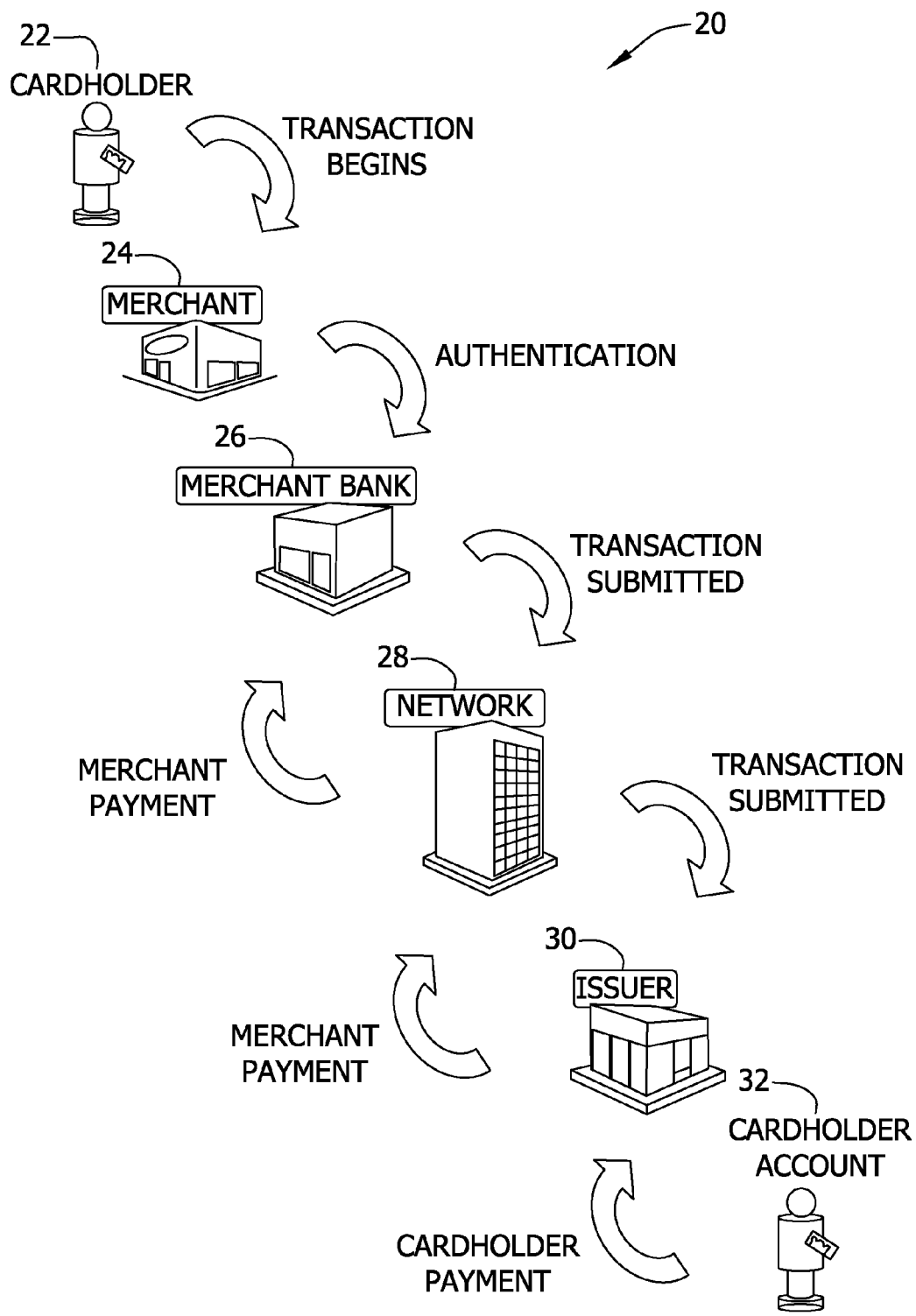
FIG. 1 is a schematic diagram illustrating an exemplary multi-party payment card industry system for enabling ordinary payment-by-card transactions.

Set forth below is a description of methods and systems for analyzing "weirdness" of a plurality of identified variables. For each identified variable, a plurality of parameters are calculated. By ranking the parameters for each of the identified variables relative to parameters for related variables, a weirdness score for each variable is calculated. The variables are sorted by their respective weirdness scores and at least a portion of the sorted variables are displayed.

As used herein the term "weirdness" is defined as an indication of how unexpected and/or anomalous a measured value of a variable is. That is, the more unexpected and/or anomalous the measured value is, the "weirder" the variable is. More specifically, the methods and systems described herein utilize relatively simple forecasts based on history of a particular variable, compare actual data to those forecasts, and rank the data for how unusual and/or significant those differences are compared to history. The methods and systems described herein may also be utilized to produce a ranked list of the most surprising variables.

In general, the methods and systems described herein rank a variable for each of three parameters: (1) how big the difference is between the measured value and the predicted value; (2) how unusual the difference is between the measured value and the predicted value for that variable; and (3) how unusual the difference is between the measured value and the predicted value compared to a peer group of variables. In the exemplary embodiment, the ranks for each parameter are weighted and combined to form a weirdness score. Variables can be sorted by the weirdness score to achieve a final ranking of how weird each variable is.

By ranking different types of variables against each other, the methods and systems described herein highlight surprising data regardless the type of data. Further, the methods and systems described herein compare different types of data to avoid false positives for seasonal/cyclical variances. Moreover, unlike at least some known data analysis systems, the systems and methods described herein do not require complicated modeling or determining alerting tolerances.

Technical effects of the methods, systems, and computer-readable media described herein include at least one of: (a) receiving a selection of a first variable included within the data set, wherein the first variable is defined by a measure, a time period, and a plurality of entities; (b) calculating a plurality of parameters for the first variable, wherein each of the plurality of parameters is calculated based at least in part on a deviation of a measured value of the first variable from a predicted value of the first variable; (c) calculating a rank for each of the plurality of parameters for the first variable, wherein the rank of each parameter is calculated relative to corresponding parameters calculated for all other variables in the data set having the same measure and time period as the first variable; and (d) calculating a weirdness score for the first variable based at least in part on the calculated rank of each of the plurality of parameters for the first variable.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Although the systems and methods described herein can be used on a variety of different types of data, the exemplary data described herein will be transaction data. For example, data generated by conducting a financial transaction, such as credit card or debit card transactions, of an interchange network. Accordingly, transaction data, payments cards, and an interchange network are described herein.

FIG. 1 is a schematic diagram 20 illustrating an exemplary multi-party payment card industry system for enabling ordinary payment-by-card transactions, such as a credit card payment system using the MasterCard® payment system. The MasterCard® payment system is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system, a financial institution called the "issuer" issues a payment account card, such as a credit card account or a debit card account, to a community participant, who uses the payment account card to tender payment for a purchase from a merchant. To accept payment with the payment account card, the merchant must normally establish an account with a financial institution that is part of the financial payment system. This financial institution is usually called the "merchant bank" or the "acquiring bank" or "acquirer bank." When a community participant, also referred to as a cardholder 22, tenders payment for a purchase with a payment account card (also known as a financial transaction card), the merchant 24 requests authorization from the merchant bank 26 for the amount of the purchase. The request may be performed over the telephone, but is usually performed through the use of a point-of-sale terminal, which reads the community participant's account information from the magnetic stripe on the payment account card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the network, also referred to as an interchange 28, the computers of the merchant bank or the merchant processor will communicate with the computers of the issuer bank 30 to determine whether the community participant's account is in good standing and whether the purchase is covered by the community participant's available credit line or account balance. Based on these determinations, the request for authorization will be declined or accepted. If the request is accepted, or approved, an authorization code is issued to the merchant.

When a request for authorization is accepted, the available credit line or available balance of community participant's account 32 is decreased. Normally, a charge is not posted immediately to a community participant's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a community participant cancels a transaction before it is captured, a "void" is generated. If a community participant returns goods after the transaction has been captured, a "credit" is generated.

For debit card transactions, when a request for a PIN authorization is approved by the issuer, the community participant's account, also referred to as the cardholder's account 32, is decreased. Normally, a charge is posted immediately to a community participant's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

Financial transaction cards or payment account cards can refer to credit cards, debit cards, and prepaid cards. These cards can all be used as a method of payment for performing a transaction. As described herein, the term "financial transaction card" or "payment account card" includes cards such as credit cards, debit cards, and prepaid cards, but also includes any other devices that may hold payment account information, such as mobile phones, personal digital assistants (PDAs), and key fobs.

Figure 2:
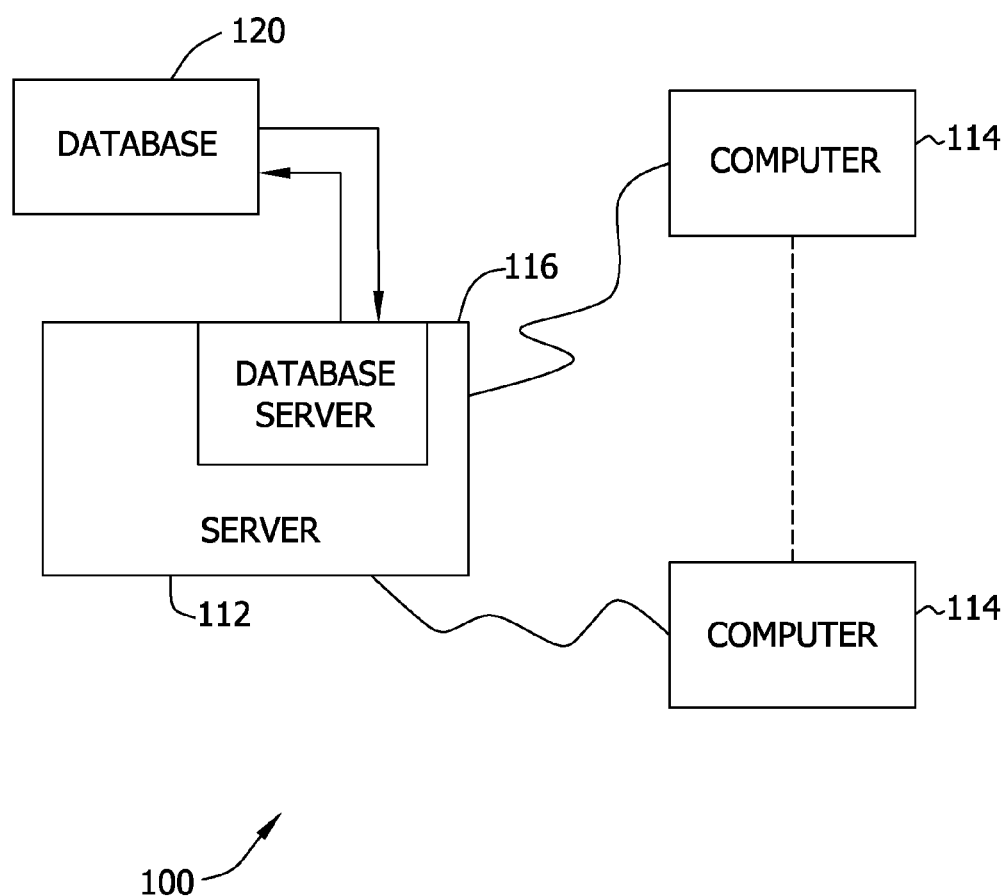
FIG. 2 is a simplified block diagram of an exemplary computer system for analyzing weirdness of a plurality of variables.

FIG. 2 is a simplified block diagram of an exemplary system 100 that may be used for analyzing weirdness of a plurality of variables in accordance with one embodiment of the present invention. System 100 is a client/server system that may be utilized for storage and delivery of files. More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 may be interconnected to the Internet through a variety of interfaces including a network, such as a local area network (LAN) or a wide area network (WAN), dial-in-connections, cable modems and special high-speed ISDN lines. Client systems 114 could be any device capable of interconnecting to the Internet including a personal computer (PC), a web-based phone, personal digital assistant (PDA), or other web-based connectable equipment.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store electronic files. Electronic files may include electronic documents, web pages, image files, sound files, video files, and/or electronic data of any format suitable for storage in database 120 and delivery using system 100.

More specifically, database 120 may store transaction data generated as part of sales activities conducted over a network including data relating to merchants, account holders or customers, developers, issuers, acquirers, purchases made, and services provided by system 100. For example, server system 112 could be in communication with an interchange network, such as network 28 (shown in FIG. 1). Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

Figure 3:
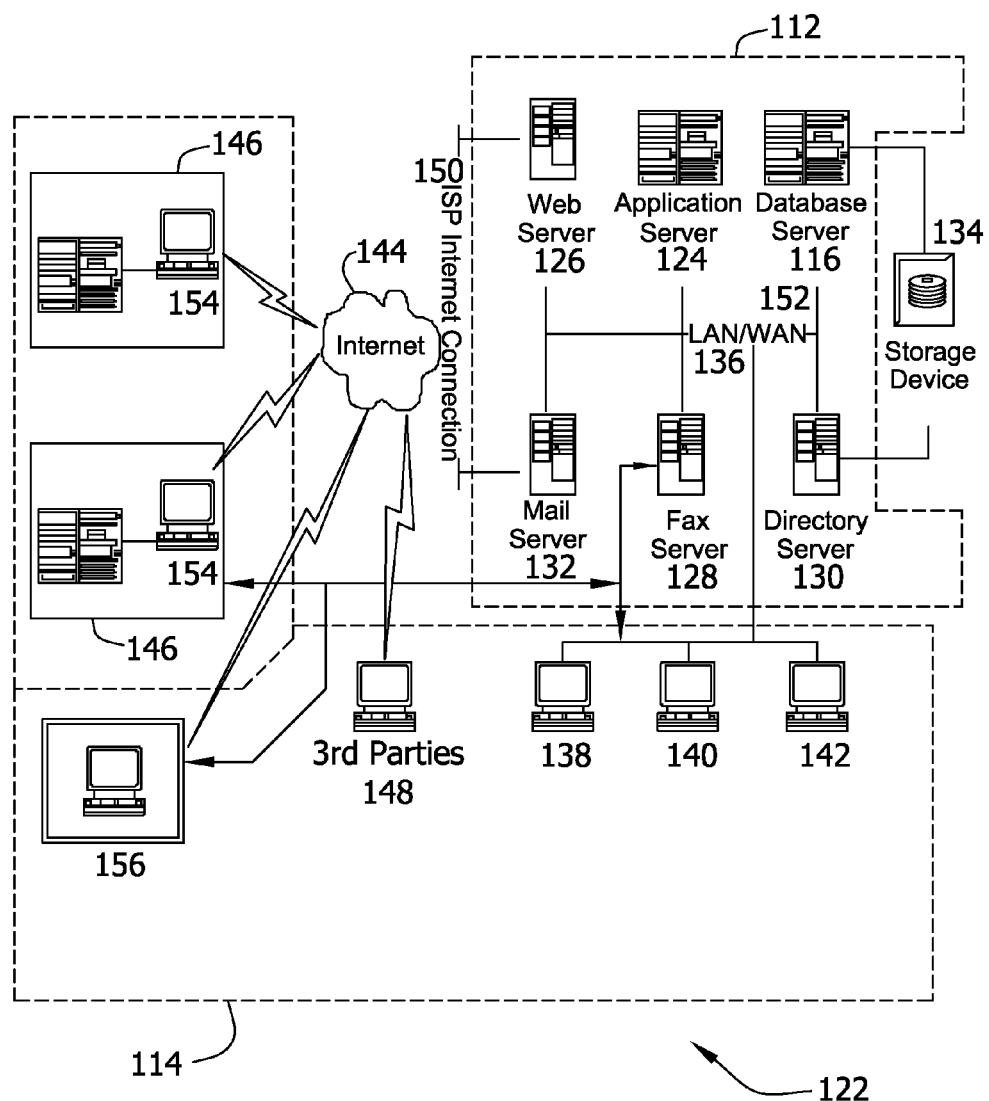
FIG. 3 is an expanded block diagram of an exemplary embodiment of a server architecture of a computer system for analyzing weirdness of a plurality of variables.

FIG. 3 is an expanded block diagram of an exemplary embodiment of a server architecture of a system 122 for analyzing weirdness of a plurality of variables. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A storage device 134, for example, a disk storage unit, is coupled to database server 116 and directory server 130. Storage device 134 may be configured to store a database, for example, database 120 (shown in FIG. 2). Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136, for example, using an Internet 144 link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 146 and other third parties 148, using an ISP Internet connection 150. The communication in the exemplary embodiment is illustrated as being performed using the Internet 144, however, any other wide area network (WAN) type communication can be utilized in other embodiments, i.e., the systems and processes are not limited to being practiced using Internet 144. In addition, and rather than WAN 152, local area network 136 could be used in place of WAN 152.

In the exemplary embodiment, any authorized individual having a workstation 154 can access system 122. At least one of the client systems includes a manager workstation 156 located at a remote location. In the exemplary embodiment, workstations 154 and 156 are personal computers having a web browser. Also, workstations 154 and 156 are configured to communicate with server system 112. Furthermore, fax server 128 communicates with remotely located client systems, including client system 114 using a telephone link. Fax server 128 is configured to communicate with other workstations 138, 140, and 142 as well.

As used herein, the terms "software" and "firmware" are interchangeable, and include any computer program stored in memory for execution by personal computers, workstations, clients and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
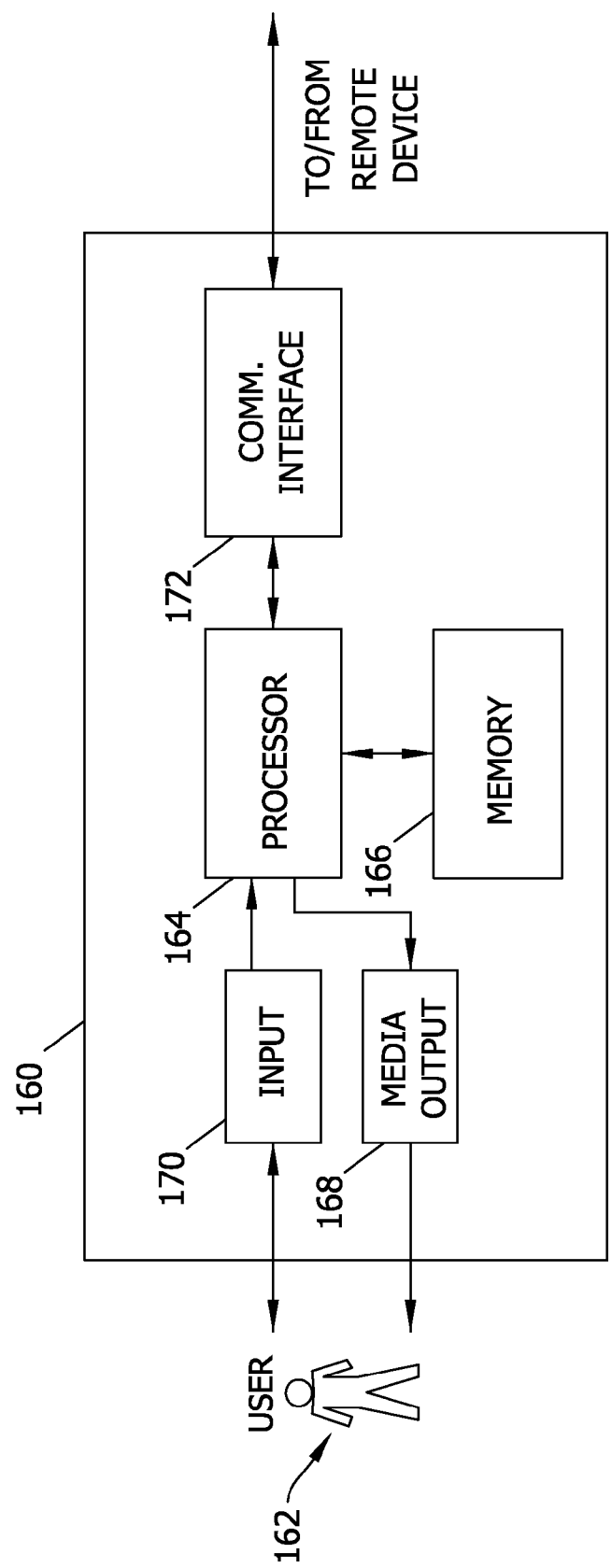
FIG. 4 illustrates an exemplary configuration of a client system shown in FIGS. 2 and 3.

FIG. 4 illustrates an exemplary configuration of a user computing device 160 operated by a user 162. User computing device 160 may include, but is not limited to, client systems 114, 138, 140, and 142, workstation 154, and manager workstation 156 (shown in FIG. 3).

User computing device 160 includes a processor 164 for executing instructions. In some embodiments, a memory area 166, or other computer-readable media, stores executable instructions. Processor 164 may include one or more processing units (e.g., in a multi-core configuration). Memory area 166 is any device allowing information such as executable instructions and/or written works to be stored and retrieved. Memory area 166 may include one or more computer-readable media.

User computing device 160 also includes at least one media output component 168 for presenting information to user 162. Media output component 168 is any component capable of conveying information to user 162. In some embodiments, media output component 168 includes an output adapter such as a video adapter and/or an audio adapter. An output adapter is operatively coupled to processor 164 and operatively couplable to an output device such as a display device (e.g., a liquid crystal display (LCD), organic light emitting diode (OLED) display, or "electronic ink" display) or an audio output device (e.g., a speaker or headphones).

In some embodiments, user computing device 160 includes an input device 170 for receiving input from user 162. Input device 170 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 168 and input device 170.

User computing device 160 may also include a communication interface 172, which is communicatively couplable to a remote device such as server system 112 (shown in FIG. 3). Communication interface 172 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 166 are, for example, computer readable instructions for providing a user interface to user 162 via media output component 168 and, optionally, receiving and processing input from input device 170. A user interface may include, among other possibilities, a web browser and client application. Web browsers enable users, such as user 162, to display and interact with media and other information typically embedded on a web page or a website from server system 112. A client application allows user 162 to interact with a server application from server system 112.

Figure 5:
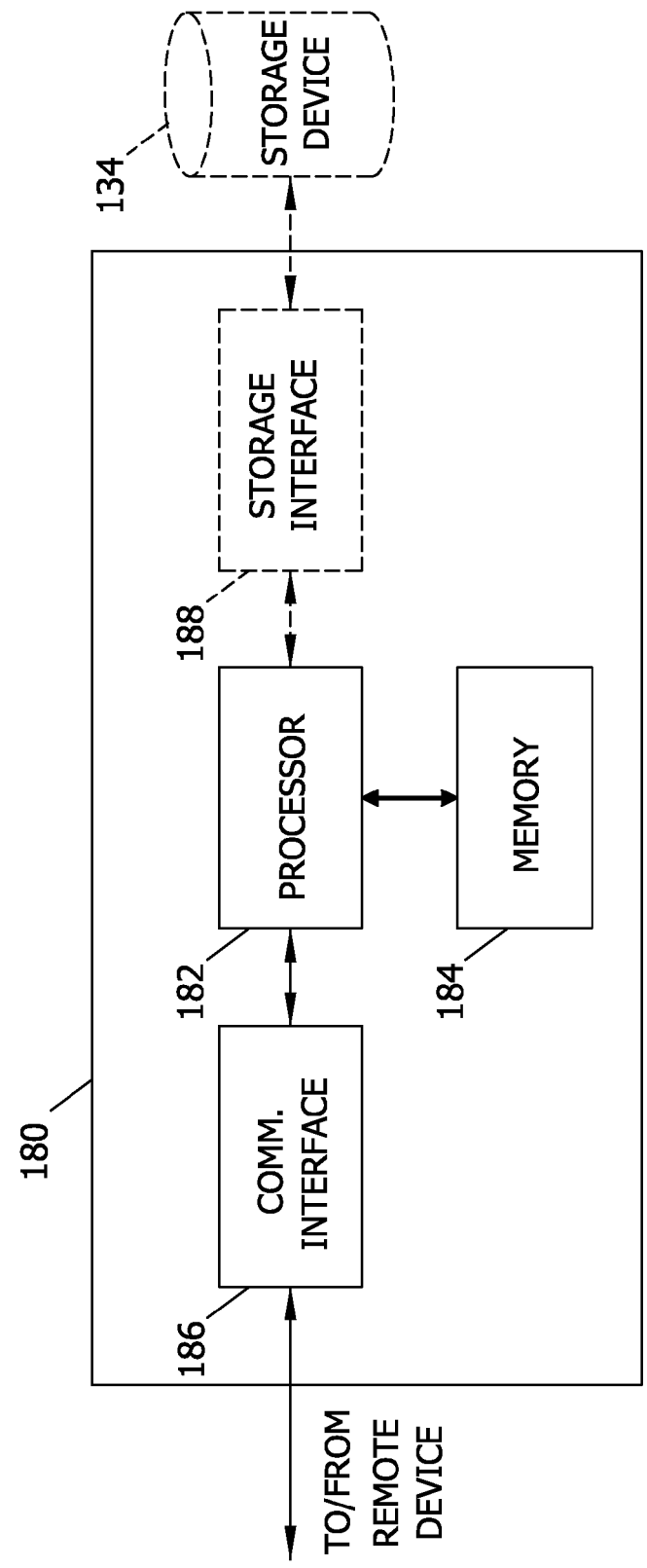
FIG. 5 illustrates an exemplary configuration of a server system shown in FIGS. 2 and 3.

FIG. 5 illustrates an exemplary configuration of a server computing device 180 such as server system 112 (shown in FIG. 3). Server computing device 180 may include, but is not limited to, database server 116, application server 124, web server 126, fax server 128, directory server 130, and mail server 132.

Server computing device 180 also includes a processor 182 for executing instructions. Instructions may be stored, for example, in a memory area 184 or other computer-readable media. Processor 182 may include one or more processing units (e.g., in a multi-core configuration).

Processor 182 is operatively coupled to a communication interface 186 such that server computing device 180 is capable of communicating with a remote device such as user computing device 160 (shown in FIG. 4) or another server computing device 180. For example, communication interface 186 may receive requests from client system 114 via the Internet, as illustrated in FIG. 3.

Processor 182 may also be operatively coupled to storage device 134. Storage device 134 is any computer-operated hardware suitable for storing and/or retrieving data. In some embodiments, storage device 134 is integrated in server computing device 180. For example, server computing device 180 may include one or more hard disk drives as storage device 134. In other embodiments, storage device 134 is external to server computing device 180 and may be accessed by a plurality of server computing devices 180. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 182 is operatively coupled to storage device 134 via a storage interface 188. Storage interface 188 is any component capable of providing processor 182 with access to storage device 134. Storage interface 188 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 182 with access to storage device 134.

Figure 6:
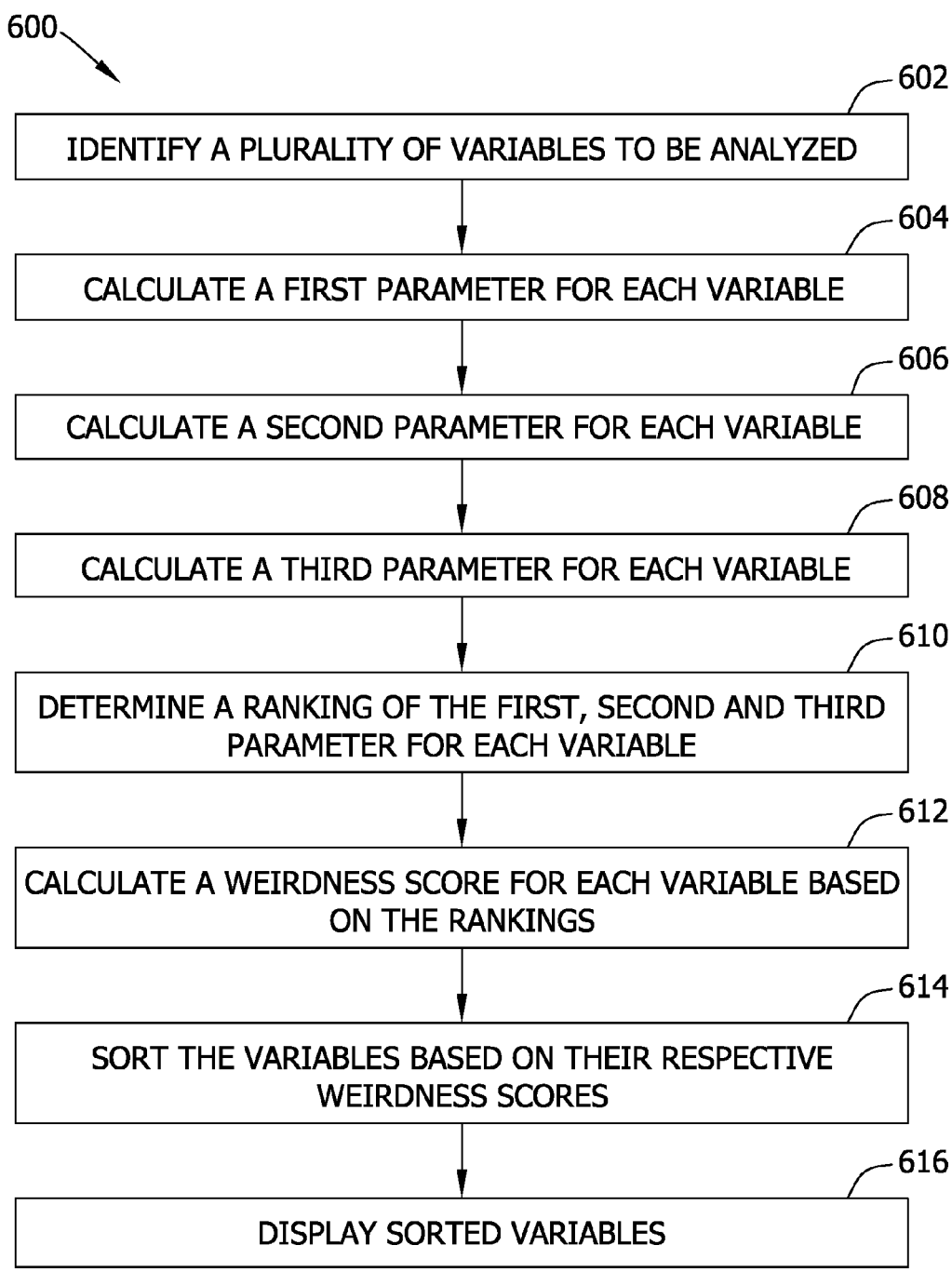
FIG. 6 is a flow chart illustrating an exemplary method implemented using the computer system shown in FIG. 2 for analyzing weirdness of a plurality of variables.

FIG. 6 is a flow chart illustrating an exemplary method 600 implemented using the computer system 100 shown in FIG. 2 for analyzing weirdness of a plurality of variables.

In the exemplary embodiment, a weirdness score is generated for each of a plurality of variables, as described in detail below. The score indicates how "weird" the variable is (i.e., how much the measured value of the variable deviates from expected values). Accordingly, after determining a plurality of scores, the variables can be sorted by their respective scores to generate a list of the "weirdest" (i.e., most anomalous) variables.

In method 600, the plurality of variables to be analyzed is identified 602. The variables may be identified 602, for example, by a user selecting the variables on a client system, such as client system 114 (shown in FIG. 2). In the exemplary embodiment, the analyzed variables are related to financial transaction data and are each defined by a measure, a time period, and a plurality of entities, as described in detail below. In the exemplary embodiment, these selected variables are part of a data a set stored in a database, such as database 120 (shown in FIG. 2).

In the exemplary embodiment, a measure for each variable may include, for example, a number of transactions, a number of authorization requests, a number of authorization declines, a number of authorization approvals, a dollar value for all transactions, a dollar value for authorization requests, a dollar value for authorization declines, a dollar value for authorization approvals, a number of cash cleared transactions, a dollar value for cash cleared transactions, a number of point of sale transactions, and/or a dollar value for point of sale transactions.

Additionally, in the exemplary embodiment, each variable is also defined by a time period. For example, a variable may be associated with a particular day of the week (e.g., a total number of authorization declines on Monday), a particular calendar day (e.g., a total number of authorization declines on January 1), a particular week, and/or a particular month. Further, a time period for each variable may include a particular day of the week, a particular month, a particular year, and/or any other time period that enables system 100 to function as described herein.

Further, in the exemplary embodiment, each variable is also defined by a plurality of entities. For example, the entities could include a specific merchant (e.g., a total number of authorization declines at Merchant A), or a group of merchants (e.g., a total number of authorization declines at Merchants A, B, and C). Moreover, a variable may have an entity that specifies a product (e.g., a total number of authorization declines for attempted purchases of a Product W), a particular financial transaction card (e.g., a total number of authorization declines for Credit Card X), an issuing bank (e.g., a total number of authorizations for financial transactions cards issued by Bank Y), and/or an issuing country (e.g., a total number of authorizations for financial transactions cards issued in Country Z).

Accordingly, in one embodiment, a sample variable might be the total number of authorization declines (the measure), on a Thursday (the time period), for a particular credit card, issued by a particular bank, in a particular country (the entities). Alternatively, a variable may represent any quantity that enables system 100 to function as described herein.

In the exemplary embodiment, the identified variables are selected by a user using a client system 114 (shown in FIG. 2). For example, the user may choose to analyze all daily authorization approvals for the month of January. In another example, the user may choose to analyze all variables related to authorization declines and authorization approvals for Jan. 1, 2010. The user may select the identified variables using an input device of client system 114. Alternatively, the identified variables may include a predetermined set of variables.

While in the exemplary embodiment, variables are related to financial transaction data, the methods and systems described herein may be used to measure variables in other industries and/or environments. For example, in a business environment, the variables may include a number of business transactions in a predetermined geographic region, a number of international transactions, and/or a number of transactions for a predetermined transaction type. In a program performance environment, the variables may include a duration of time it takes a particular program to complete a particular task, a number of records accessed by a particular program, a file size of an input file for a particular task, and/or a start time of each task executed. Accordingly, those of ordinary skill in the art will appreciate that the methods and systems described herein may be utilized to monitor variables in a wide variety of industries and/or environments.

For each variable for which a weirdness score is to be calculated, a measured value of the variable and a predicted value of the variable are stored in a memory, such as database 120 (shown in FIG. 2). Once the variables to be analyzed are identified 602, a first parameter for each variable is calculated 604, a second parameter for each variable is calculated 606, and a third parameter for each variable is calculated 608, as described in detail below. The first, second, and third parameters may be calculated using any suitable computing device, for example, server 112 and/or client system 114 (both shown in FIG. 2).

For each variable, the computing device determines 610 a rank of the first, second, and third parameters relative to parameters for related variables. In the exemplary embodiment, the rank of the first, second, and third parameters is determined relative to parameters of variables having the same measure and time period.

Using the processor, a weirdness score for each variable is then calculated 612 based on the rank of the first parameter, the rank of the second parameter, and the rank of the third parameter for the respective variable. The calculation 612 of the weirdness score is described below in detail.

In the exemplary embodiment, the variables are sorted 614 by their respective weirdness scores, and at least some of the ranked variables are displayed on a display device, such as a display device of client system 114 (shown in FIG. 2). For example a "Top 10 List" of the ten weirdest variables may be displayed.

For clarity, a particular example of calculating a weirdness score for a variable is discussed herein. In this example, the variable analyzed is the number of authorization declines on a Friday for Credit Card X issued by Bank Y in Country Z. This example is merely exemplary, and in no way limits the embodiments described herein.

As explained above, a first parameter is calculated 604 for each variable, a second parameter is calculated 606 for each variable, and a third parameter is calculated 608 for each variable. In the exemplary embodiment, the first parameter is calculated 604 based on the measured value of the variable and the predicted value of the variable stored in memory. In the exemplary embodiment, the predicted value for a particular variable is a smoothed rolling average of previously measured values of the variable. The previously measured values of the variable may be stored in a memory, such as database 120 (shown in FIG. 2). In the exemplary embodiment, the first parameter is the absolute difference between the measured value and the predicted value, given by Equation 1.

$$FP=|MV-PV| \qquad \text{(Equation 1)}$$

where FP is the first parameter, MV is the measured value for the variable, and PV is the predicted value for the variable. Alternatively, the first parameter may be calculated 604 using any suitable method that enables system 100 to function as described herein.

The percentage variance of the first parameter can also be calculated using Equation 2.

$$\% \text{ var}=FP/PV \qquad \text{(Equation 2)}$$

where % var is the percentage variance, FP is the first parameter, and PV is the predicted value.

For example, assume the measured value is 906 authorization declines on a particular Friday for Credit Card X issued by Bank Y in Country Z. Further, assume the predicted value is 174.2 authorization declines. That is, the average number of daily declines on a Friday for Credit Card X issued by Bank Y in Country Z is 174.2. Accordingly, in the example, using Equation 1, the first parameter is |906−174.2|, or 731.8 declines. Further, using Equation 2, the percentage variance of the first parameter is (731.8/174.2), or 420%.

In the exemplary embodiment, the processor calculates 606 the second parameter for each variable based on the percentage variance of the first parameter and an average percentage variance for the particular variable. The average percentage variance for a particular variable is an average of previously measured percentage variances for that variable. In the exemplary embodiment, the second parameter is a number of standard deviations that the percentage variance of the first parameter deviates from the average percentage variance, as given by Equation (3).

$$SP=(\% \text{ var}-\text{Avg } \% \text{ var})/\sigma \qquad \text{(Equation 3)}$$

where SP is the second parameter, % var is the percentage variance of the first parameter, Avg % var is the average percentage variance for the variable, and σ is the standard deviation of the average percentage variance. Accordingly, the second variable can be referred to as the variance from self history. Alternatively, the second parameter may be calculated 606 using any suitable method that enables system 100 to function as described herein.

In the example, as explained above, the percentage variance is 420%. Further, assume that the average percentage variance is calculated by taking the average of previous percentage variances for the same variable (i.e., the same measure, time period, and entities), and assume that the calculated average percentage variance is 19%. Moreover, assume a standard deviation of the average percentage variance is 72.9%.

To calculate 606 the second parameter in the example, using Equation 3, the percentage variance of the first parameter, 420%, is expressed in terms of how many standard deviations (or sigmas) it is from the average percentage variance. Accordingly, the second parameter is (420−19)/72.9, or 5.5 sigmas from the average percentage variance.

In the exemplary embodiment, the processor calculates 608 the third parameter based on the percentage variance of the first parameter and an average percentage variance for previously recorded values of a peer group. The peer group is a larger set of data that includes the particular variable. In the exemplary embodiment, the peer group is all variables having the same measure and time period as the particular variable, and at least one entity in common with the particular variable. For example, in the particular example, the peer group is all authorization declines for a Friday for Credit Card X in Country Z. Note however, that the peer group includes any issuing bank, and is not limited to Bank Y.

Accordingly, instead of using an average percentage variance for the particular variable, the third parameter is calculated 608 using an average percentage variance for the peer group of variables. In some embodiments, the peer group used for each variable is the same. Alternatively, the peer group used in calculating 608 the third parameter may be different for at least some of the identified variables.

In the exemplary embodiment, similar to the second parameter, the third parameter is a number of standard deviations that the percentage variance of the first parameter deviates from the average percentage variance of the peer group, and can be calculated using Equation (4).

$$TP = (\% \text{ var} - \text{Avg } \% \text{ var\_peer}) / \sigma\_peer \quad \text{(Equation 4)}$$

where TP is the third parameter, % var is the percentage variance of the first parameter, Avg % var_peer is the average percentage variance for the peer group, and σ_peer is the standard deviation of the average percentage variance for the peer group. Accordingly, the third parameter can be referred to as the variance from peer history. Alternatively, the third parameter may be calculated 608 using any suitable method that enables system 100 to function as described herein.

In the example, as explained above, the percentage variance for the first parameter is 420%. Further, in the example, the peer group is selected as the authorization declines on a Friday for Credit Card X issued in Country Z by any bank. Note that the peer group is broader than the particular variable, as the peer group is not limited to issuing Bank Y, but includes any issuing bank.

Notably, the peer group may be any set of data that is broader than the particular variable and that includes the particular variable. In the particular example given, alternative peer groups could include authorization declines for Credit Card X issued by Bank Y in any country, authorization declines for any cards issued by Bank Y in Country Z, authorization declines for all Credit Card X in any country issued by any bank, authorization declines for all cards issued by Bank Y in any country, or authorization declines for all cards issued in Country Z by any bank.

In the example, assume that the average percentage variance for previous Fridays for the peer group is 1.6%, and that the standard deviation for the average percentage variance for the peer group is 11%. To calculate 608 the third parameter, using Equation 4, the percentage variance of the first parameter, 420%, is expressed in terms of how many standard deviations (or sigmas) it is from the average percentage variance. Accordingly, the third parameter is (420−1.6)/11, or 38 sigmas from the average percentage variance of the peer group.

The above process is repeated to calculate the first, second, and third parameters for each identified variable. Then, as described above, a ranking is determined 610 for the first, second, and third parameters. Specifically, in the exemplary embodiment the first parameters for variables having the same measure and time period are compared and ranked relative to one another, the second parameters for variables having the same measure and time period are compared and ranked relative to one another, and the third parameters for variables having the same measure and time period are compared and ranked relative to one another. Because different variables are ranked against one another, unexpected measured values for variables may be highlighted, regardless of the entity.

In the example, assume that all of the identified variables are related to authorization declines on a Friday (i.e., the number of authorization declines for a Friday for Credit Card X issued by Bank Y in Country Z, the number of authorization declines for a Friday for Credit Card A issued by Bank B in Country C, the number of authorization declines for a Friday for Credit Card X issued by any Bank in Country Z, etc.). Alternatively, the identified variables could be any selection of variables.

When ranking the parameters of the particular variable in the example (i.e., the number of authorization declines on a Friday for Credit Card X issued by Bank Y in Country Z) against the parameters for variables having the same measure and time period, assume it is determined that the first parameter, the 731.8 decline difference, is the $3,720^{th}$ largest absolute difference in authorization declines for the day. Further assume that the second parameter, the 5.5 sigma difference, is the $1,063^{rd}$ largest authorization decline sigma variance from self history for the day, and that the third parameter, the 38 sigma difference, is the $971^{st}$ largest authorization decline sigma variance from peer history for the day.

Based on the rankings of the first, second and third parameters, the weirdness score is calculated 612. In the exemplary embodiment, the weirdness score for a particular variable is a weighted sum of the first parameter rank, the second parameter rank, and the third parameter rank, as given by Equation 5.

$$WS = (\text{Rank\_1})(w1) + (\text{Rank\_2})(w2) + (\text{Rank\_3})(w3) \quad \text{(Equation 5)}$$

where WS is the weirdness score, Rank_1 is the rank of the first parameter, w1 is the weight given to the first parameter, Rank_2 is the rank of the second parameter, w2 is the weight given to the second parameter, Rank_3 is the rank of the third parameter, and w3 is the weight given to the third parameter.

In the example, the ranks of the second and third parameters are weighted so each of them counts for half as much as the rank of the first parameter. Specifically, w1=1, w2=2, and w3=2. Using Equation 5, the weirdness score for authorization declines for Friday for Credit Card X issued by Bank Y in Country Z is 3720+(2*1063)+(2*971), or 7788. Alternatively, w1, w2, and w3 may be any suitable weights that enable system 100 to function as described herein. For example, in one embodiment, the ranks are weighted equally (i.e., w1=w2=w3).

Notably, the lower the weirdness score, the weirder the particular variable is. This is, the larger the value of the first, second, or third parameter (i.e., indicating deviation from expected values), the lower the rank of the respective parameter will be. The lower rank (i.e., ranked No. 1 or No. 2) indicates that the parameter is weirder (i.e., more unexpected and/or anomalous) than other parameters, and accordingly, the total weirdness score will be lower than other parameters.

Once the weirdness score for each variable is calculated 612, the variables are sorted 614 based on their respective scores. In the example, assume that the weirdness score of 7788 is the lowest score of any variable in the plurality of identified variables. Accordingly, the number of authorization declines for Credit Card X issued by Bank Y in Country Z is the weirdest variable of the plurality of identified variables.

At least a portion of the sorted variables are displayed 616 for viewing by a user. The sorted variables may be displayed 616 on a display device, such as a display device of client system 114 (shown in FIG. 2). In one embodiment, a "Top 10 List" of weird data is displayed.

FIG. 7 is an exemplary screenshot 700 of a list of the top ten weirdest variables. In the embodiment of FIG. 7, the identified variables are not limited to variables associated with only one day. Further, the identified variables include different types of variables, including cleared cash, authorization declines, and authorization approvals.

By viewing a list of the weirdest variables, a user can quickly identify a set of unexpected and/or anomalous variables and attempt to determine and address the cause. For example, suppose several of the weirdest variables all share a common issuing bank. This indicates to the user that something is potentially amiss with that particular issuing bank.

By identifying weird variables using the methods and systems described herein, unusual and/or unexpected incidents can be revealed by determining that a particular variable is weird. For example, a run on a bank could quickly be identified by determining that the amount of withdrawals from the bank is a weird variable. Similarly, the methods and systems described herein may be utilized to identify the business impact of a natural disaster or the efficiency of a suite of computer programs. Accordingly, the embodiments described herein may be utilized in a variety of industries and/or environments, and are not limited to analyzing financial transaction data. Moreover, as compared to at least some known data and/or statistical analysis systems, the methods and systems described herein are relatively simple to implement, and do not require complex modeling algorithms to generate results.

The embodiments described herein provide methods and systems for analyzing weirdness of a plurality of identified variables. For each identified variable, a plurality of parameters are determined. By ranking the parameters for each of the identified variables relative to parameters for related variables, a weirdness score for each variable is calculated. The variables are sorted by their respective weirdness scores and at least a portion of the sorted variables are displayed.

Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-based method of determining a weirdness score for variables within a data set, said method performed using a computer coupled to a database, said method comprising:

receiving a selection of a first variable included within the data set, wherein the first variable is defined by a measure, a time period, and a plurality of entities;

calculating a plurality of parameters for the first variable, wherein each of the plurality of parameters is calculated based at least in part on a deviation of a measured value of the first variable from a predicted value of the first variable;

calculating a rank for each of the plurality of parameters for the first variable by:

identifying all other variables in the data set that have the same measure as the first variable and the same time period as the first variable;

identifying, for each of the other variables, a plurality of parameters that correspond to the plurality of parameters for the first variable; and for each parameter of the plurality of parameters for the first variable, ranking the parameter for the first variable relative to the corresponding parameters for the other variables; and calculating a weirdness score for the first variable, wherein the weirdness score is indicative of how unexpected the measured value of the first variable is, and wherein the weirdness score depends on the calculated rank of each of the plurality of parameters for the first variable.

2. A computer-based method according to claim 1, wherein calculating a plurality of parameters comprises calculating a first parameter, a second parameter, and a third parameter for the first variable.

3. A computer-based method according to claim 2, wherein calculating a first parameter comprises calculating the first parameter using $$FP=|MV-PV|,$$

wherein FP is the first parameter, MV is the measured value of the first variable, and PV is the predicted value of the first variable.

4. A computer-based method according to claim 2, wherein calculating a second parameter comprises calculating the second parameter using $$SP=(\%\ var-Avg\ \%\ var)/\sigma,$$

wherein SP is the second parameter, % var is a percentage variance of the first variable, Avg % var is an average percentage variance for previously recorded values of the first variable, and $\sigma$ is a standard deviation of the average percentage variance.

5. A computer-based method according to claim 2, wherein calculating a third parameter comprises calculating the third parameter using $$TP=(\%\ var-Avg\ \%\ var\_peer)/\sigma\_peer$$

wherein TP is the third parameter, % var is a percentage variance of the first variable, Avg % var_peer is an average percentage variance for previously recorded values of a peer group of variables, and σ_peer is a standard deviation of the average percentage variance for the peer group, and wherein the peer group of variables includes variables in the data set having the same measure and time period as the first variable, and at least one entity in common with the first variable.

6. A computer-based method according to claim 1, wherein calculating a weirdness score comprises calculating a weighted sum of the ranks of each of the plurality of parameters for the first variable.

7. A computer-based method according to claim 1, wherein receiving a selection of a first variable included within the data set comprises receiving a selection of the first variable included within a data set containing financial transaction data.

8. A computer-based method according to claim 1, wherein receiving a selection of a first variable included within the data set comprises receiving a selection of a plurality of variables included within the data set.

9. A computer-based method according to claim 8, further comprising:
sorting the plurality of variables based on their respective weirdness scores; and
displaying at least a portion of the sorted variables.

10. A computer system for determining a weirdness score for variables within a data set, said computer system comprising:
a memory device for storing data; and
a computing device comprising a processor, said computing device coupled to said memory device, said computing device configured to:
receive a selection of a first variable included within the data set, wherein the first variable is defined by a measure, a time period, and a plurality of entities;
calculate a plurality of parameters for the first variable, wherein each of the plurality of parameters is calculated based at least in part on a deviation of a measured value of the first variable from a predicted value of the first variable;
calculate a rank for each of the plurality of parameters for the first variable by:
identifying all other variables in the data set that have the same measure as the first variable and the same time period as the first variable;
identifying, for each of the other variables, a plurality of parameters that correspond to the plurality of parameters for the first variable; and
for each parameter of the plurality of parameters for the first variable, ranking the parameter for the first variable relative to the corresponding parameters for the other variables; and
calculate a weirdness score for the first variable, wherein the weirdness score is indicative of how unexpected the measured value of the first variable is, and wherein the weirdness score depends on the calculated rank of each of the plurality of parameters for the first variable.

11. A computer system according to claim 10, wherein to calculate a plurality of parameters said computing device is configured to calculate a first parameter, a second parameter, and a third parameter for the first variable.

12. A computer system according to claim 11, wherein to calculate a first parameter said computing device is configured to calculate the first parameter using $$FP=|MV-PV|,$$

wherein FP is the first parameter, MV is the measured value of the first variable, and PV is the predicted value of the first variable.

13. A computer system according to claim 11, wherein to calculate a second parameter said computing device is configured to calculate the second parameter using $$SP=(\% \text{ var}-\text{Avg } \% \text{ var})/\sigma,$$

wherein SP is the second parameter, % var is a percentage variance of the first variable, Avg % var is an average percentage variance for previously recorded values of the first variable, and σ is a standard deviation of the average percentage variance.

14. A computer system according to claim 11, wherein to calculate a third parameter said computing device is configured to calculate the third parameter using $$TP=(\% \text{ var}-\text{Avg } \% \text{ var\_peer})/\sigma\_peer$$

wherein TP is the third parameter, % var is a percentage variance of the first variable, Avg % var_peer is an average percentage variance for previously recorded values of a peer group of variables, and σ_peer is a standard deviation of the average percentage variance for the peer group, and wherein the peer group of variables includes variables in the data set having the same measure and time period as the first variable, and at least one entity in common with the first variable.

15. A computer system according to claim 10, wherein to calculate a weirdness score said computing device is configured to calculate a weighted sum of the ranks of each of the plurality of parameters for the first variable.

16. A computer system according to claim 10, wherein to receive a selection of a first variable included within the data set said computing device is configured to receive a selection of the first variable included within a data set containing financial transaction data.

17. A computer system according to claim 10, wherein to receive a selection of a first variable included within the data set said computing device is configured to receive a selection of a plurality of variables included within the data set.

18. A computer system according to claim 17, wherein said computing device is further configured to:
sort the plurality of variables based on their respective weirdness scores; and
display at least a portion of the sorted variables.

19. A computer program embodied on a non-transitory computer readable medium for determining a weirdness score for variables within a data set, said program comprises at least one code segment executable by a computer to instruct the computer to:
receive a selection of a first variable included within the data set, wherein the first variable is defined by a measure, a time period, and a plurality of entities;
calculate a plurality of parameters for the first variable, wherein each of the plurality of parameters is calculated based at least in part on a deviation of a measured value of the first variable from a predicted value of the first variable;
calculate a rank for each of the plurality of parameters for the first variable by:
identifying all other variables in the data set that have the same measure as the first variable and the same time period as the first variable;
identifying, for each of the other variables, a plurality of parameters that correspond to the plurality of parameters for the first variable; and for each parameter of the plurality of parameters for the first variable, ranking the parameter for the first variable relative to the corresponding parameters for the other variables; and calculate a weirdness score for the first variable, wherein the weirdness score is indicative of how unexpected the measured value of the first variable is, and wherein the weirdness score depends on the calculated rank of each of the plurality of parameters for the first variable.

20. A computer program according to claim 19, wherein to calculate a plurality of parameters said program comprises at least one code segment executable by the computer to instruct the computer to:

calculate a first parameter, a second parameter, and a third parameter for the first variable.

21. A computer program according to claim 20, wherein to calculate a first parameter said program comprises at least one code segment executable by the computer to instruct the computer to:

calculate the first parameter using $FP=|MV-PV|$, wherein FP is the first parameter, MV is the measured value of the first variable, and PV is the predicted value of the first variable.

22. A computer program according to claim 20, wherein to calculate a second parameter said program comprises at least one code segment executable by the computer to instruct the computer to:

calculate the second parameter using $SP=(\% \text{ var}-\text{Avg } \% \text{ var})/\sigma$, wherein SP is the second parameter, % var is a percentage variance of the first variable, Avg % var is an average percentage variance for previously recorded values of the first variable, and $\sigma$ is a standard deviation of the average percentage variance.

23. A computer program according to claim 20, wherein to calculate a third parameter said program comprises at least one code segment executable by the computer to instruct the computer to:

calculate the third parameter using $TP=(\% \text{ var}-\text{Avg } \% \text{ var\_peer})/\sigma\_peer$ wherein TP is the third parameter, % var is a percentage variance of the first variable, Avg % var_peer is an average percentage variance for previously recorded values of a peer group of variables, and $\sigma\_peer$ is a standard deviation of the average percentage variance for the peer group, and wherein the peer group of variables includes variables in the data set having the same measure and time period as the first variable, and at least one entity in common with the first variable.

24. A computer program according to claim 19, wherein to calculate a weirdness score said program comprises at least one code segment executable by the computer to instruct the computer to:

calculate a weighted sum of the ranks of each of the plurality of parameters for the first variable.

25. A computer program according to claim 19, wherein to receive a selection of a first variable included within the data set said program comprises at least one code segment executable by the computer to instruct the computer to:

receive a selection of the first variable included within a data set containing financial transaction data.

26. A computer program according to claim 19, wherein to receive a selection of a first variable included within the data set said program comprises at least one code segment executable by the computer to instruct the computer to:

receive a selection of a plurality of variables included within the data set.

27. A computer program according to claim 26, wherein said program comprises at least one code segment executable by the computer to instruct the computer to:

sort the plurality of variables based on their respective weirdness scores; and display at least a portion of the sorted variables.

28. A network-based system for determining a weirdness score for variables within a data set, said system comprising:

a client computer system;

a database; and a server system coupled to said client computer system and said database, said server system configured to:

receive from said client computer system a selection of a first variable included within the data set, wherein the first variable is defined by a measure, a time period, and a plurality of entities;

calculate a plurality of parameters for the first variable, wherein each of the plurality of parameters is calculated based at least in part on a deviation of a measured value of the first variable from a predicted value of the first variable;

calculate a rank for each of the plurality of parameters for the first variable by:

identifying all other variables in the data set that have the same measure as the first variable and the same time period as the first variable;

identifying, for each of the other variables, a plurality of parameters that correspond to the plurality of parameters for the first variable; and for each parameter of the plurality of parameters for the first variable, ranking the parameter for the first variable relative to the corresponding parameters for the other variables; and calculate a weirdness score for the first variable, wherein the weirdness score is indicative of how unexpected the measured value of the first variable is, and wherein the weirdness score depends on the calculated rank of each of the plurality of parameters for the first variable.

* * * * *